United States Patent
Miao

(10) Patent No.: US 7,030,346 B1
(45) Date of Patent: Apr. 18, 2006

(54) MOISTURE ADDING MICROWAVE LID APPARATUS

(76) Inventor: Wen Miao, 21213-B Hawthorne Blvd. #5211, Torrance, CA (US) 90503

( * ) Notice: Subject to any disclaimer, the term of this patent is extended or adjusted under 35 U.S.C. 154(b) by 0 days.

(21) Appl. No.: 11/118,943

(22) Filed: Apr. 28, 2005

(51) Int. Cl.
*H05B 6/80* (2006.01)

(52) U.S. Cl. ............... 219/731; 219/734; 219/682; 99/DIG. 14; 426/241; 220/368

(58) Field of Classification Search ........ 219/725–735, 219/682; 99/DIG. 14; 426/118, 241, 243; 220/368
See application file for complete search history.

(56) References Cited

U.S. PATENT DOCUMENTS

| | | |
|---|---|---|
| 4,705,927 A | 11/1987 | Levendusky et al. |
| 4,989,748 A | 2/1991 | Parr et al. |
| 5,313,878 A | 5/1994 | Strait |
| 6,803,551 B1 | 10/2004 | Kim et al. |
| 2004/0188442 A1* | 9/2004 | Ohyama ............... 220/367.1 |

FOREIGN PATENT DOCUMENTS

JP          9-56599     *   3/1997

* cited by examiner

*Primary Examiner*—Philip H. Leung
(74) *Attorney, Agent, or Firm*—Edwin P. Tarver; Patel & Alumit, P.C.

(57) ABSTRACT

A moisture-adding microwave food cover apparatus, comprising of a capped (not absolutely essential, but part of the current implementation of the design) conical or dome-like structure, with an upper liquid reservoir, cool fin handle, removable top center cap, and a lower condensed moisture reservoir. The apparatus may be manufactured from any microwaveable material and it is efficient in preventing spatter, retaining heat, retaining moisture, and adding moisture to food that is heated or cooked using a microwave oven. The apparatus is easy to use, easy to clean, easy to manufacture, and reduces the time required to cook or heat food in a microwave.

10 Claims, 6 Drawing Sheets

MOISTURE ADDING MICROWAVE LID APPARATUS

CROSS-REFERENCE TO RELATED APPLICATIONS

None

FEDERALLY SPONSORED RESEARCH

Not Applicable

SEQUENCE LISTING OR PROGRAM

Not Applicable

FIELD OF INVENTION

The present invention relates to ovenware elements for use in microwave ovens and more particularly to a cover apparatus that retains and adds moisture to food heated or cooked in a microwave oven.

BACKGROUND

Microwave ovens provide a quick and convenient means of cooking or heating food in a short interval of time. For this reason, they have become popular among people who do not have time to cook by conventional means. However, in a typical microwave oven, a large percentage of the moisture originally contained in the food is lost to the surrounding atmosphere. The forced circulation of air through and away from the heating chamber of the oven, compounded by the relatively large volume of the heating chamber compared to the volume of the heated food causes this.

Sometimes, a chef or other person using a microwave oven might want more moisture retained in or more water added to what they are cooking. To accomplish this, they can cover a dish or food container during cooking or reheating. There are several ways of covering microwave dishes, and several products have been developed in an attempt to address this issue.

For example, U.S. Pat. No. 4,705,927 to Levendusky, et al., describes a microwave oven cooking container with a bed or pad of absorbent material upon which a container is placed carrying the various food items to be heated or cooked. The absorbent material, designed to give off steam during cooking, also retains hot moisture after the cooking process. Meanwhile, U.S. Pat. No. 4,989,748 to Parr, Jr., et al., discloses a paper cone or dome-shaped dish cover with horizontal rings of concave cavities to trap moisture. Gravity causes droplets running down the interior surface of the cover to catch in the cavities and re-vaporize. It is unclear how many uses this paper device would last before it would have to be disposed.

Further, in U.S. Pat. No. 5,313,878 to Strait, Jr., several ovenware apparatuses are disclosed. They are designed to prevent or reduce the escape of moisture or water vapor from food as it is cooked by circulating condensed moisture back into the food. These re-hydrating devices are large and bulky. Additionally, U.S. Pat. No. 6,803,551 to Kim, et al., discloses a large cooking vessel used in microwave ovens including a lower section containing water, a food supporting plate, and a lid that covers the lower body. The several parts of this apparatus make it structurally complicated.

A variety of common problems is associated with the aforementioned cooking vessels or apparatuses as well: One is that they become very hot during the cooking process, absorbing microwave and/or steam energy, and can therefore cause injury to the user. Many of them also allow condensed moisture to run back into the food dish, leading to soggy or waterlogged food.

The design of the present invention overcomes these shortcomings and provides an apparatus that efficiently retains and/or adds moisture to the food that is cooked or heated in a microwave or conventional oven. One of the objects of the present invention is to provide a moisture-adding lid apparatus that can cover a food container, such as a plate, bowl, pan, etc., and form an enclosed cavity.

Another object of the invention is to provide a moisture-adding lid apparatus wherein the apparatus incorporates a handle that remains relatively cool during the cooking process so a person can lift the entire structure out of the microwave immediately after cooking without needing an oven mitt or other protective insulation. Another object of the invention is to provide a moisture-adding lid apparatus that collects moisture from condensation during the cooking process and keeps it from spilling on food and making it soggy, while allowing condensed moisture to re-vaporize and moisturize the food as it cooks.

Another object of the invention is to provide a moisture-adding lid apparatus to which liquids can be added before the cooking process to increase the moisture content of cooked foods. Still another object of the invention is to provide a moisture—adding lid apparatus that is easy to use, easy to clean, and easy to manufacture; that guards against food splatter during the operation of the microwave and reduces the time required to cook or heat food. These and other objects will become apparent from the accompanying drawings and the following description.

SUMMARY

The present invention is directed to a capped moisture-adding lid apparatus for a microwave or conventional oven that includes a liquid reservoir for adding additional or recovered moisture back to covered food during the cooking process and reduces the overall loss of moisture from food as it is being cooked. The apparatus integrates two liquid retention structures at its top and bottom perimeter to collect condensed moisture formed during the cooking process, and keep it from spilling back onto the food or out into the microwave. It also discloses a handle that remains cool during and after the cooking process, and a lid to regulate moisture retention depending on the type of food being prepared. The apparatus is easy to use, easy to clean and easy to manufacture. It guards against spattering while the microwave is on, and reduces the overall time required to heat or cook food in a microwave.

FIGURES—REFERENCE NUMERALS

5 . . . Moisture Adding Lid Apparatus
6 . . . Lower Liquid Reservoir
7 . . . Lid Surface
8 . . . Upper Liquid Reservoir
9 . . . Liquid Fill Line
10 . . . Vapor Infusion/Escape Channel
11 . . . Cool Fin Handle
12 . . . Removable Cap
13 . . . Removable Cap Finger Grooves

DESCRIPTION

Figure 1:
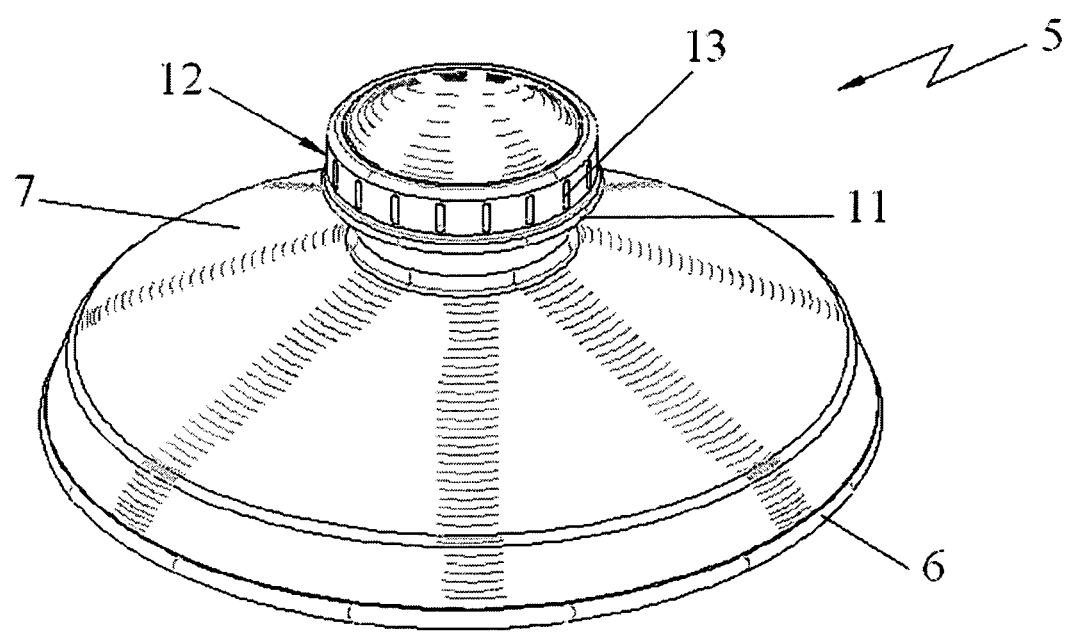
FIG. 1 is a perspective angle side-view of the moisture-adding lid apparatus in accordance with the present invention.
Figure 2:
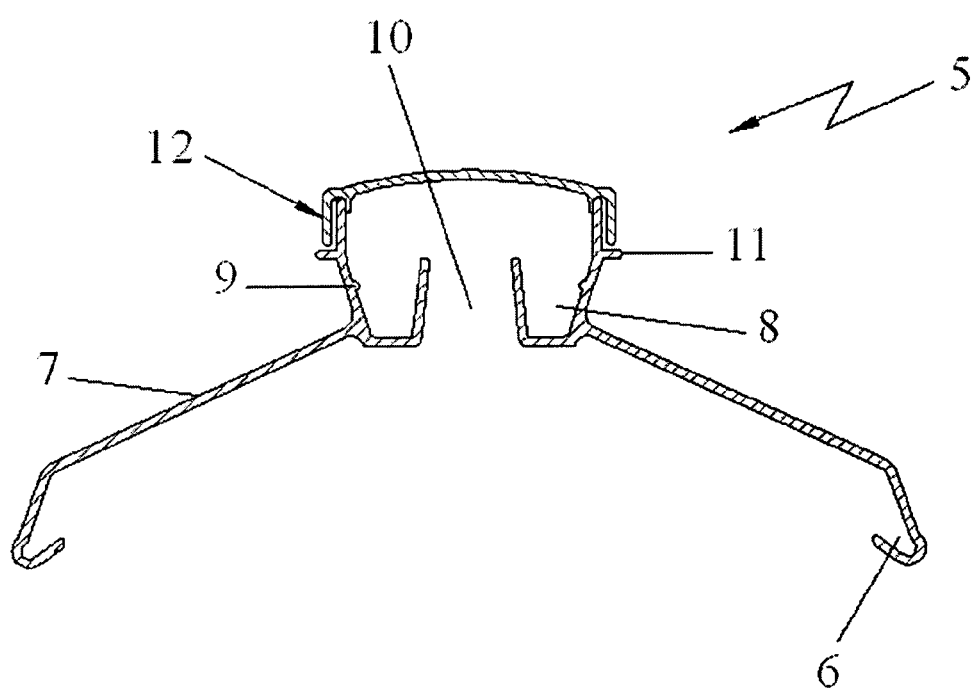
FIG. 2 is a cross section side side-view of the apparatus of FIG. 1 in accordance with the present invention.

Referring to FIG. 1, a preferred embodiment of the moisture-adding lid apparatus is illustrated and indicated generally. The apparatus 5 comprises of a lower liquid reservoir 6; a sloping lid surface 7; an upper liquid reservoir 8 with a fill line 9; a vapor infusion/escape channel 10; a cool fin handle 11; and a removable cap 12 that may contain finger grooves 13 for easier removal. The apparatus may be manufactured from any microwaveable material.

The apparatus 5 is placed over a food dish or food container in a microwave, such as a plate, bowl, pan, etc., forming an enclosed cavity. The upper liquid reservoir 8 of the apparatus can be filled with water up to the liquid fill line 9 depending on the desired moisture content and cooking results. As the microwave heats the food enclosed by the cover apparatus 5 and food container, moisture in the reservoir is heated and turns to steam permeating the enclosed cavity and moisturizing as it heats the food. Moisture driven off as steam from the food may condense on the lid surface 7, run down, and collect in the lower reservoir 6 where it is re-vaporized.

The top of the apparatus 5 contains a channel 10 by which vapor from the upper reservoir 8 makes its way down into the enclosed space during heating or cooking. On the bottom of the apparatus 5 along the perimeter is a lower liquid reservoir 6 that collects condensed moisture formed during the cooking process. It keeps the condensed moisture from spilling into the microwave or onto the food. In other preferred embodiments of the present invention, this lower reservoir 6 may also increase in size, so that a larger quantity of liquid can be added directly to it as well.

Immediately beneath the cap 12 of the apparatus 5 is a thin, horizontally extended cool fin 11 that remains relatively cool during and after the cooking process. It provides a means with which to safely handle the apparatus 5 immediately out of the oven without the use of an oven mitt or other protective insulation.

The cap 12 at the top of the apparatus can be removed to add liquid to the upper reservoir 8 without removing the whole apparatus 5 from its position in the microwave oven. It can also be left off during cooking to allow moisture to escape, and may have indentations, grooves 13 or another gripping means to aid in removal from the cover apparatus 5.

Figure 3:
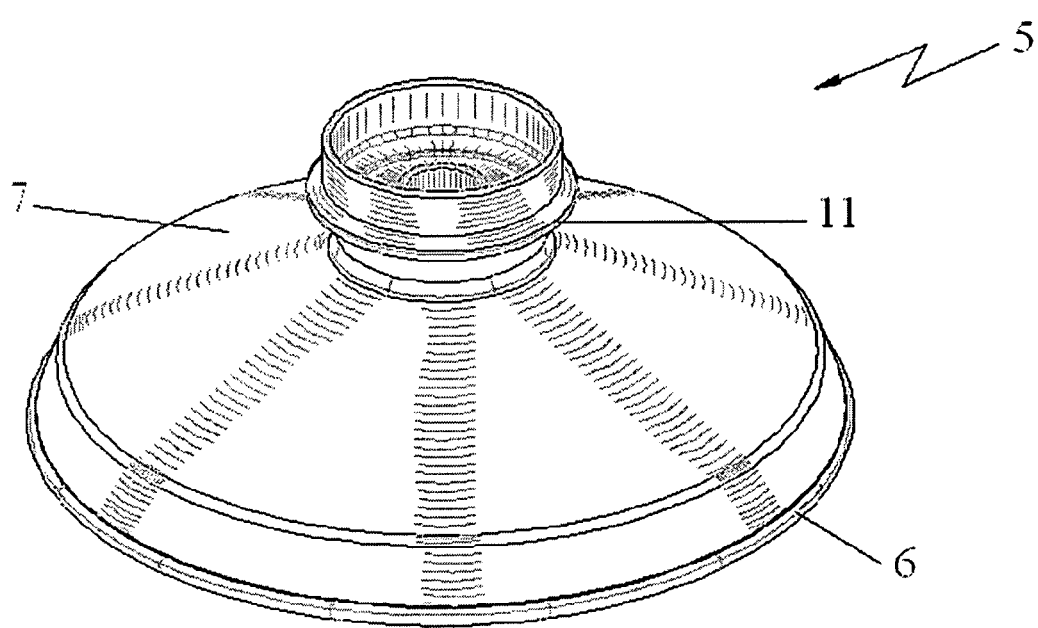
FIG. 3 is a perspective angle side-view of the apparatus of FIG. 1 with the removable cap removed.
Figure 4:
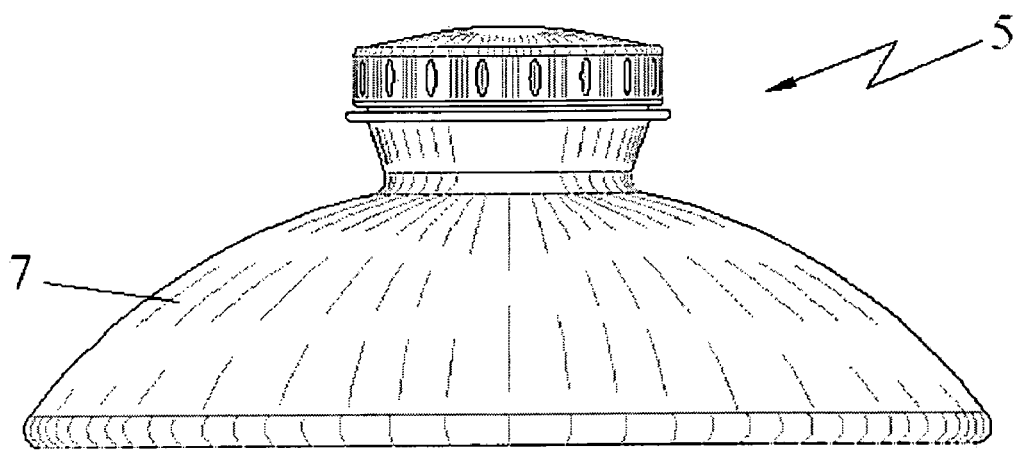
FIG. 4 is an alternate embodiment of the present invention, in which the cover surface is dome shaped overall.
Figure 5:
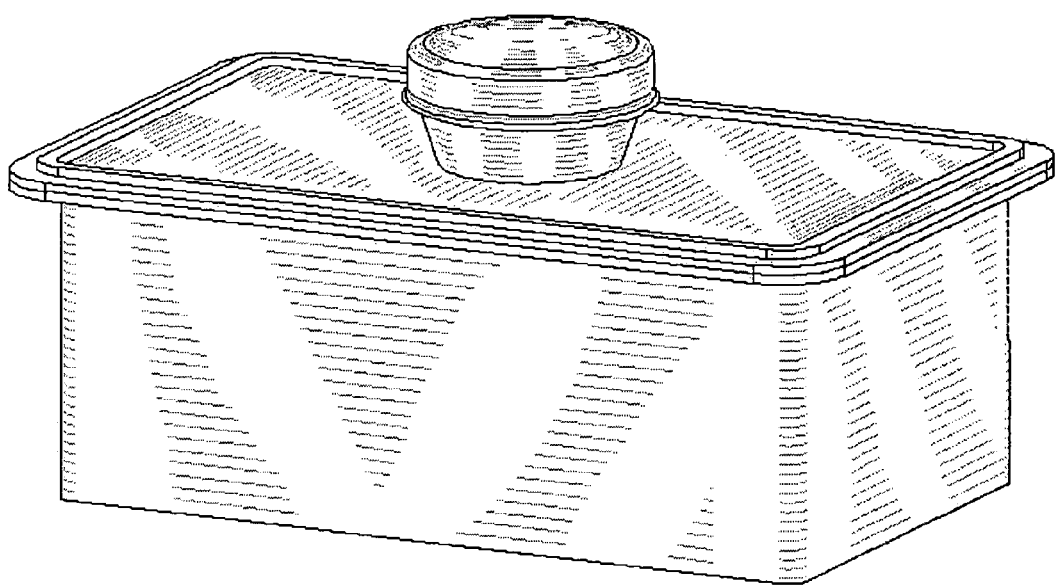
FIG. 5 is an alternate embodiment of the present invention, wherein the microwave lid comprises a sealable container for generating steam.
Figure 6:
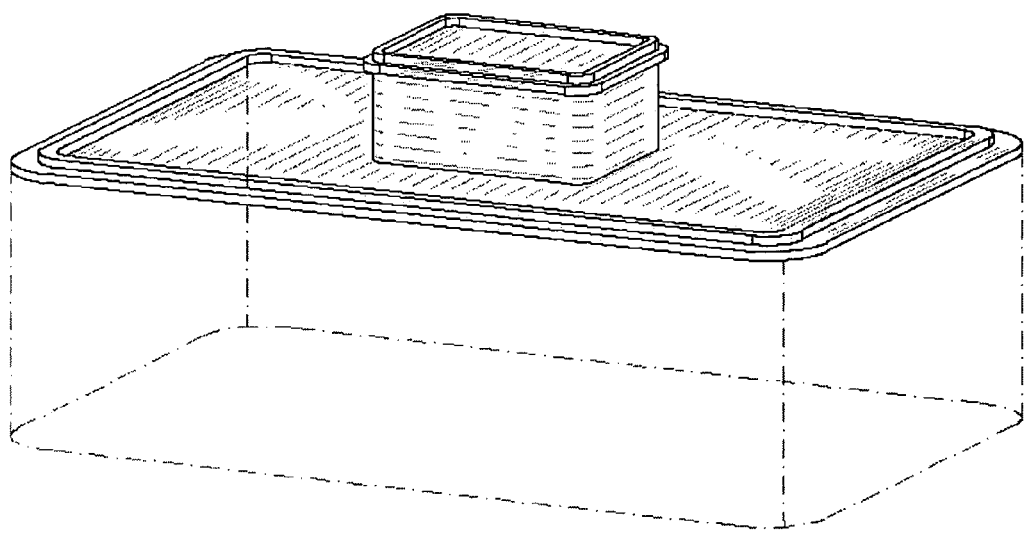
FIG. 6 is an alternate embodiment of the present invention, wherein the microwave lid comprises a lid to a conventional sealable microwavable dish

In other embodiments of the invention, the design or geometry of the lid surface 7 can be varied to suit different customer needs and preferences. FIG. 4 shows one such variation. These varying designs make the apparatus of the present invention flexibile enough to cover most types of food containers. FIG. 3 shows an embodiment of the present invention with the cap removed to allow moisture to escape during heating or cooking while still guarding against spattering.

Although these preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A cover apparatus for food, food dishes, and containers used in microwave ovens to contain spattering material, retain heat, and retain and infuse moisture into heated or cooked food, comprising:
   a conical or dome-like downward and outward sloping surface;
   a central removable cap and channel opening in top center of the apparatus;
   an upper reservoir receptacle means of holding a quantity of water or other liquid to be retained or vaporized and infused into said food, wherein the upper reservoir receptacle means is attached to the top portion of the apparatus and whereby vapor from the upper reservoir receptacle means travels through said channel and makes its way down into an enclosed space during heating or cooking;
   a lower reservoir receptacle means of holding a quantity of water or other liquid to be retained, vaporized, or re-vaporized under said container cover and infused into said food, wherein the lower reservoir receptacle means is attached to the bottom portion of the apparatus along its perimeter and whereby the lower reservoir receptacle means additionally operates as a basin, which can catch excess moisture condensing on the undersurface of said apparatus for re-vaporization or removal; and a horizontal fin structure extending radially outward under said cap to serve as a gripping means with which to handle the apparatus can be safely handled after cooking.

2. The apparatus of claim 1, wherein said cover is made of a microwavable material.

3. The apparatus of claim 1, wherein said cover contains upper and lower reservoir receptacle means that can be filled prior to heating or cooking for infusing vapor moisture into food or serve as receptacles for moisture driven off during heating or cooking.

4. The apparatus of claim 3, wherein said upper reservoir receptacle means has a fill line to prevent overfilling of the upper reservoir receptacle means.

5. The apparatus of claim 1, wherein said lower reservoir receptacle means comprising a centripetally rounded lip to catch condensed moisture running down the underside of said apparatus.

6. The apparatus of claim 1, wherein said removable cap has finger grooves, indentations, or similar means to aid in removal from the apparatus, and can be left off during heating or cooking to permit more vapor loss.

7. The apparatus of claim 1, wherein said horizontal fin extends outward to permit it to remain cool during microwave heating or cooking.

8. The apparatus of claim 1, wherein said downward sloping surface has an increasing downward arc, a decreasing downward arc, or is varied in pitch.

9. The apparatus of claim 1, wherein the external perimeter shape or footprint of said apparatus is circular, square or varied in dimension.

10. A method of creating a pocket of steam to surround food as it is cooking in a cover apparatus used in microwave ovens, wherein said apparatus comprises: a conical or dome-like downward and outward sloping surface; a central removable cap and channel opening in top center of the apparatus; an upper reservoir receptacle means of holding a quantity of water or other liquid to be retained or vaporized and infused into said food, wherein the upper reservoir receptacle means is attached to the top portion of the apparatus and whereby vapor from the upper reservoir receptacle means travels through said channel and makes its way down into an enclosed space during heating or cooking; a lower reservoir receptacle means of holding a quantity of water or other liquid to be retained, vaporized, or re-vaporized under said container cover and infused into said food, wherein the lower reservoir receptacle means is attached to the bottom portion of the apparatus along its perimeter and whereby the lower reservoir receptacle means additionally operates as a basin, which can catch excess moisture condensing on the undersurface of said apparatus for re-vaporization or removal; and a horizontal fin structure extending radially outward under said cap to serve as a gripping means with which the apparatus can be safely handled after cooking; and wherein in said method a small amount of water is introduced to said upper/lower reservoir receptacle means prior to activating the microwave oven, after which the small amount of water turns into steam which surrounds the food as it cooks.

* * * * *